3,288,858
SULFOXIDES AND SYNTHESES THEREOF
Warren I. Lyness, Mount Healthy, and David E. O'Connor, Cincinnati, Ohio, assignors to The Procter & Gamble Company, Cincinnati, Ohio, a corporation of Ohio
No Drawing. Filed Mar. 30, 1965, Ser. No. 444,069
7 Claims. (Cl. 260—607)

This application is a continuation-in-part of the copending application of Warren I. Lyness, David E. O'Connor and Jim S. Berry, Serial Number 246,351, filed December 21, 1962, now abandoned.

This invention relates to sulfoxide compounds containing ether linkages and to methods for synthesizing said compounds. Compounds containing both a sulfoxide group and ether linkages are very useful surface active agents.

Normally sulfoxides are prepared by oxidizing the corresponding sulfide, however, this oxidation method is not desirable since the oxidation method normally produces a mixture of compounds containing some unreacted sulfides and/or some sulfone by-products which are generally undesirable. It is difficult or impossible to separate the sulfides and sulfones from the desired sulfoxides.

It can be appreciated therefore that an effective method for introducing a sulfoxide group and ether linkages into the same compound is desirable. It can equally be appreciated that a method which permits the formation of compounds containing both ether linkages and sulfoxide groups without the use of high temperatures, corrosive oxidizing agents and specialized equipment is very desirable.

Accordingly, it is an object of this invention to prepare compounds containing both a sulfoxide group and ether linkage by methods which avoid the aforesaid defects.

It is a more specific object of this invention to provide new sulfoxides containing ether linkages and having superior surface active properties.

It is a yet further object of this invention to provide detergent compositions containing the sulfoxide detergents of this invention.

The objects of this invention can be accomplished by reacting a compound having the formula $$R-SO-\left[-\underset{R^2}{\overset{R^1}{\underset{|}{C}}}-\right]_Y \left[-\underset{H}{\overset{R^3}{\underset{|}{C}}}-\underset{H}{\overset{R^4}{\underset{|}{C}}}-O-\right]_Q M^{\oplus}$$

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are each selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkage, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein $R^3$ and $R^4$ are each selected from the group consisting of hydrogen, aryl hydrocarbon groups, alkyl aryl hydrocarbon groups, alkyl hydrocarbon groups, and aliphatic ring hydrocarbon groups, said $R^3$ and $R^4$ hydrocarbon groups each containing from 1 to about 30 carbon atoms and from 0 to about 10 linkages selected from the group consisting of ether and thioether linkages, and wherein Q is an integer from 1 to about 50 and wherein Y is selected from the group consisting of 0 and 1, and wherein M is an alkali metal, with an alkyl halide having the formula $$R^5\text{—}CH_2\text{—}X$$

wherein X is selected from the group consisting of bromine, chlorine and iodine atoms and $R^5$ is selected from the group consisting of hydrogen, alkyl, aryl and aryl substituted alkyl hydrocarbon groups containing from 1 to about 30 carbon atoms.

This reaction proceeds as follows:

$$R-SO-\left[-\underset{R^2}{\overset{R^1}{\underset{|}{C}}}-\right]_Y \left[-\underset{H}{\overset{R^3}{\underset{|}{C}}}-\underset{H}{\overset{R^4}{\underset{|}{C}}}-O-\right]_Q^{\ominus} M^{\oplus} + R^5\text{—}CH_2X$$

yields $$R-SO-\left[-\underset{R^2}{\overset{R^1}{\underset{|}{C}}}-\right]_Y \left[-\underset{H}{\overset{R^3}{\underset{|}{C}}}-\underset{H}{\overset{R^4}{\underset{|}{C}}}-O-\right]_Q -CH_2-R^5 + MX$$

*Sulfoxide starting compounds*

The sulfoxide starting compounds in the above reaction and the formation of said compounds are described in detail in the copending application of Warren I. Lyness and David E. O'Connor, Serial Number 448,228, filed concurrently herewith.

The symbols used for the sulfoxide groups $$(-\overset{O}{\underset{|}{S}}-)$$

is only a convenient representation of the structure for purposes of the description of the invention and is not necessarily indicative of the actual structure which is believed to involve a semi-polar bond. This symbol or even more simply (—SO—) is used hereinbefore and hereinafter to represent the sulfoxide group.

As used herein, the term "hydrocarbon groups" refers to both unsubstituted hydrocarbon groups and substituted hydrocarbon groups containing, for example, ether linkages. Preferably the substituent hydrocarbon groups (R) in the formulas above and below are alkyl chains, straight or branched, containing from 1 to about 22 carbon atoms (e.g., methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9-octadecenyl, cyclopentyl, cyclohexyl, cyclohexylmethyl, methylcyclohexyl, 2 - cyclohexyldodecyl, 12 - cyclohexyldodecyl, 4-dodecylcyclohexyl and propynyl). Examples of other groups include aryl groups containing 6 to 12 carbon atoms (e.g., phenyl, diphenyl and naphthyl); and alkyl aryl groups containing benzene or naphthalene groups with branched or straight alkyl chains of from 1 to about 18 carbon atoms (e.g., benzyl, 2-phenyl-dodecyl, 1-methyl-2-phenylethyl, 2-indenyl and naphthylmethyl). $R^1$, $R^2$, $R^3$ and $R^4$ are each selected from the group consisting of hydrogen and hydrocarbon groups which are the same as those examples given hereinbefore with respect to R. The presence of certain non-reactive groups in or on the substituent, R, $R^1$, $R^2$, $R^3$ or $R^4$ groups is permissible. As an example of non-reactive groups, these substituent groups can contain up to about 10 ether and/or thioether linkages. Up to five amino groups can be appended to the chain or up to ten imino $$(-\overset{H}{\underset{|}{N}}-\text{ or }-N=)$$

groups can form a part of the chain with open chain and/or cyclic configuration. (R, $R^1$ and $R^2$, have the above definitions throughout the specification and claims.)

Thus, R, $R^1$, $R^2$, $R^3$ or $R^4$ can represent, for example, such groups as 3,6,9,12,15-pentathiaheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-octylthioethyl;
11-methoxyundecyl;
11-methylthioundecyl;
11-ethoxyundecyl;
9- or 10-methoxyoctadecyl;
9- or 10-ethoxyoctadecyl;
9- or 10-methylthiooctadecyl;
2-, 3-, or 4-methoxycyclohexyl;
3- or 4-methylthiocyclohexyl;
3-cyclohexyloxydecyl;
2,5,8,11,14-pentamethyl-3,6,9,12,15-pentaoxaheneicosanyl;
2-tetrahydrofuranyl;
2-tetrahydrothiophenyl;
tetrahydropyranyl;
β-(tetrahydropyranyl)-ethyl;
β-(2-tetrahydrofuranyl)-ethyl;
tetrahydrothiofuranyl;
3,6-dioxaheptyl;
3,6-dithiaheptyl;
3,6,9-triazheneicosanyl;
β-aminoethyl;
β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl; and
2-thiazolyl.

Additionally, R can represent, for example,

β-N-anilinoethyl;
β-N-anilinopropyl;
β-N-pyridylethyl;
1-methoxy-2-indanyl;
β-N-naphthylaminoethyl;
2-benzoxazolyl and
4,6-dianilino-2-sym-triazinyl.

It will be understood that more than one sulfinyl carbanion group can be present in the molecule of component (A). This is to say there can be more than one

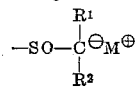

Preferably $R^1$ and $R^2$ in these additional groups are hydrogen atoms. The two sulfinyl carbanion groups should be separated by at least three aliphatic carbon atoms, but can be attached to adjacent carbon atoms on a benzene ring. Polymers containing multiple pendant alkali metal sulfinyl carbanion groups are desirable as reactants. The restriction on the number of carbon atoms which can be present in the molecule is, of course, different when more alkali metal sulfinyl carbanion groups are present. The number of carbon atoms per alkali metal sulfinyl carbanion group should not exceed 32, however.

The sodium and potassium salts of the above sulfoxide starting compounds and mixtures thereof are preferred for stability and cost considerations.

Y is zero in the above generic equation of the sulfoxide starting compound when the sulfoxide starting compound is derived from alkali metal alkanesulfenates and Y is 1 when the sulfoxide starting compound is derived from alkali metal salts of sulfinyl carbanions. Q varies in the above formula depending on the number of moles of the epoxy compounds, of the same or different structures, that are reacted with the aforementioned salts of sulfinyl carbanions and alkanesulfenates to prepare the sulfoxide starting compound of this invention. Mixtures of compounds wherein Y is 0 and 1, and/or where Q varies within the range 1 to 50, can be used.

Preferred sulfoxide starting compounds are those in which R is a methyl group, $R^1$, $R^2$ and $R^3$ are hydrogen atoms, Y and Q are both 1, and $R^4$ is an alkyl chain containing from about 8 to about 20 carbon atoms. Other preferred sulfoxide starting compounds are those in which $R^4$ is also a hydrogen atom. In preferred methods, those sulfoxide starting compounds containing a long alkyl chain group or other hydrophobic group or groups are reacted with short chain alkyl halides and those sulfoxide compounds containing no long hydrophobic group are reacted with alkyl halides containing a long hydrophobic group.

*The alkyl halide compounds*

The alkyl portions of $R^5$ can contain from 0 to about 10 linkages selected from the group consisting of ether and thioether linkages. Any branched, ring, or straight chain hydrocarbon, whether saturated or unsaturated, containing a halogen atom attached to a primary, saturated alkyl carbon atom and fitting the description hereinbefore given will react in the above manner. Permissible substituent groups on these hydrocarbons include ether and thioether linkages. Examples of alkyl halide reactants suitable for use with the salts of sulfinyl carbanions include dodecyl bromide, dodecyl chloride, neopentyl chloride, docosyl bromide, octadecyl bromide, hexadecyl bromide, hexadecyl chloride, hexyl bromide, 3-(chloromethyl) heptane, amyl chloride, iso-amyl chloride, methyl chloride, methyl iodide, ethyl bromide, tetradecyl bromide, alkyl chloride, 1-bromo-3,6,9-trioxaheneicosane, 1-bromo-3,6,9,12-tetraoxatetracosane, benzyl chloride, 2-phenylethyl bromide, cyclohexylmethyl chloride, 3-pentenyl bromide, 9-octadecenyl bromide, 10-undecenyl bromide, 1-chloro-2-methoxydodecane, 9- or 10-methoxyoctadecyl bromide, 9- or 10-methylthiooctadecyl bromide, and 1-chloro-3,6-dioxaheptane. The products of these reactions either have useful and desirable surface active (including detergent) properties or are useful as intermediates in the preparation of surface active compounds.

It will be understood that the alkyl halide compounds of this invention can contain more than one —$CH_2$—X group so long as the carbon of $R^5$ joins $R^5$ to the rest of the $R^5$ group by single covalent bonds and so long as the halogen atoms are not attached to the same carbon atom or to adjacent carbon atoms. The presence of additional reactive sites simply allows the alkyl halide compound to react with more than one mole of sulfoxide starting compounds as hereinbefore described.

Preferred alkyl halide compounds are those containing an alkyl chain containing from about 8 to about 20 carbon atoms. When the sulfoxide starting compound has a long alkyl chain or other hydrophobic group or groups, methyl, ethyl and propyl halides are preferred reactants.

*Conditions of the reaction*

Dimethyl sulfoxide is an excellent solvent for the reactions of this invention and in most instances an excess of dimethyl sulfoxide is the preferred solvent. However, other non-reactive solvents or diluents can be used, especially other sulfoxide compounds. These solvents preferably should not contain any reactive constituent either as part of the structure of the solvent or as part of impurities present in the solvent if maximum yields are desired. The use of solvents which will react with the primary reactants of this invention is generally undesirable. Suitable non-reactive solvents or diluents for the above reactions of sulfoxide starting compounds and alkyl halide compounds are to be found in such classes of compounds as the alipathic or aromatic hydrocarbons, aliphatic, aromatic or mixed aliphatic-aromatic ethers, cyclic ethers and amines. Examples of suitable non-reactive hydrocarbon solvents include hexane, petroleum ether, "Stoddard" solvent, benzene, toluene and mixed xylenes. Among the ether compounds which are suitable as solvents are diethyl ether, dibutyl ether, anisole, diphenyl ether, tetrahydrofuran, 1,2-dimethoxyethane and diethylene glycol dimethyl ether. Amine compounds which can serve as solvents for the reactions of this invention include butylamine, N-methyl butylamine, anhydrous ethylene diamine, pyridine and morpholine. Anhydrous liquid ammonia can also be used as a solvent. Still another compound which is suitable is N,N-dimethyl formamide. Other similar non-reactive solvents or diluents can be used with substantially equivalent results.

The rate and course of the above reactions can be affected by the choice of solvent. The use of mixtures of two or more non-reactive compounds as the reaction medium is, of course, suitable and in some cases preferable to the use of a single species. A temperature range of about 0° C. to about 100° C. is suitable for carrying out reactions of this invention.

*The sulfoxide compounds of this invention*

The products of this reaction are unique in that they are generally obtained in a much purer state than might be possible by any known synthesis techniques which might be applied. As a consequence, they are less likely to have an odor or to contain ineffective or undesirable by-products.

The sulfoxide compounds of this invention which contain ether linkages have the general formula

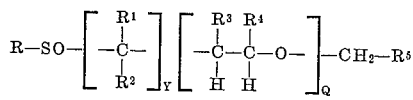

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are each selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein $R^3$ and $R^4$ are each selected from the group consisting of hydrogen, aryl hydrocarbon groups, alkyl aryl hydrocarbon groups, alkyl hydrocarbon groups, and aliphatic ring hydrocarbon groups, said $R^3$ and $R^4$ hydrocarbon groups containing from 1 to about 30 carbon atoms and from 0 to about 10 linkages selected from the group consisting of ether and thioether linkages, and wherein Q is an integer from 1 to about 50 and wherein Y is selected from the group consisting of 0 and 1, and wherein $R^5$ is selected from the group consisting of hydrogen, alkyl, aryl, and aryl substituted alkyl hydrocarbon groups containing from 1 to about 30 carbon atoms.

*Detergent compositions*

The novel sulfoxides of this invention which contain ether linkages are useful per se as detergent and surface active compounds or as intermediates in the preparation of detergent and surface active compounds. They are very mild to the skin.

The uses to which surface active compounds can be put are numerous and well known, e.g., preparing oil-in-water emulsions, textile treatment, dyeing, flotation, preparation of rubber latex, and the like.

The detergent compositions of this invention contain from about 0.5% to about 90% of a preferred sulfoxide material having the formula

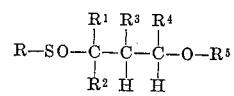

wherein at least one of the group R, $R^1$, $R^2$, $R^3$, $R^4$ and $R^5$ is an alkyl group containing from about 8 to about 18 carbon atoms and from 0 to about 10 ether linkages, the remaining groups being selected from the group consisting of hydrogen and alkyl groups containing from 1 to about 3 carbon atoms, the total number of carbon atoms in the molecule being from about 12 to about 32 carbon atoms.

Desirably, but not necessarily, the sulfoxide compounds of this invention are used with alkaline builder materials to form built detergent compositions, as for example, liquid, bar, flake, granular or tabletted granular compositions. Such compositions have enhanced detergent characteristics due to coaction in aqueous washing compositions between the hydroxy sulfoxides and the alkaline builder material.

The compositions of this invention contain from 0% to 90%, preferably from about 10% to about 90%, of water soluble alkaline detergency builder salts, either of the organic or inorganic types, and should provide a washing solution pH of about 9 to about 12. The ratio of builder salts to organic detergent is preferably from about 1:4 to about 20:1. Examples of water soluble inorganic alkaline detergency builder salts are alkali metal carbonates, phosphates, polyphosphates and silicates. Specific examples of such salts are sodium and potassium tripolyphosphates, carbonates, pyrophosphates, orthophosphates and hexametaphosphates. Examples of organic alkaline detergency builder salts are (1) alkali metal amino polycarboxylates [e.g., sodium and potassium ethylenediaminetetraacetates, N-(2-hydroxyethyl)-ethylenediaminetriacetates, nitrilo triacetates, and N-(2-hydroxyethyl)-nitrilo diacetates]; (2) alkali metal salts of phytic acid (e.g., sodium and potassium phytates—see U.S. Patent 2,739,942); (3) water soluble salts of ethane-1-hydroxy-1,1-diphosphonate (e.g., the trisodium and tripotassium salts—see U.S. Patent 3,159,581); (4) water soluble salts of methylene diphosphonic acid (e.g., trisodium and tripotassium methylene diphosphonate and the other salts described in the copending application of Francis L. Diehl, Serial Number 266,025, filed March 18, 1963); (5) water soluble salts of substituted methylene diphosphonic acids (e.g., trisodium and tripotassium ethylidene, isopropylidene, benzylmethylidene, and halomethylidene diphosphonates and the other substituted methylene diphosphonates disclosed in the copending application of Clarence H. Roy, Serial Number 266,055, filed March 18, 1963); (6) water soluble salts of polycarboxylate polymers and copolymers as described in the copending application of Francis L. Diehl, Serial Number 269,359, filed April 1, 1963 (e.g., polymers of itaconic acid, aconitic acid; maleic acid; mesaconic acid; fumaric acid; methylene melonic acid; and citronic acid and copolymers with themselves and other compatible monomers such as ethylene); and (7) mixtures thereof.

Mixtures of organic and/or inorganic builders can be used and are generally desirable. Especially preferred are the mixtures of builders disclosed in the copending application of Burton H. Gedge, Serial Number 398,705, filed September 23, 1964 (e.g., ternary mixtures of sodium tripolyphosphate, sodium nitrilotriacetate, and trisodium ethane-1-hydroxy-1,1-diphosphonate).

The detergent compositions of this invention can contain any of the usual adjuvants, diluents and additives, for example, anionic, nonionic, ampholytic, cationic or zwitterionic detergents, perfumes, anti-tarnishing agents, antiredeposition agents, bacteriostatic agents, dyes, fluorescers, suds builders, suds depressors, and the like, without detracting from the advantageous properties of the composition. Examples of anionic detergents are sodium coconut soap, sodium dodecylbenzene sulfonate and potassium tallow alkyl sulfate. Examples of nonionic detergents are dodecyldimethylamine oxide and the condensation product of coconut fatty alcohol with 5.5 moles of ethylene oxide. An example of a zwitterionic detergent is 3 - (N,N - dimethyl-N-hexadecylammonio)-2-hydroxypropane-1-sulfonate. An example of an ampholytic detergent is sodium 3-dodecylaminopropionate. An example of a cationic detergent is cetyltrimethylammonium bromide.

It is believed that the sulfoxide surface active agents of this invention are suds builders for conventional anionic detergents.

Normally the organic detergent components, the builders and the minor ingredients are incorporated into the composition prior to conversion into final product form, e.g., detergent granules, flakes, etc., but they can also be added individually in the form of particles or as liquids.

All percentages, ratios and parts herein are by weight unless otherwise specified.

The practice of the present invention is set forth in the following examples.

EXAMPLE I

Dodecene-1-oxide (0.1 mole) was added dropwise over a two-hour period to a solution of sodium-methylsulfinylcarbanion (0.1 mole) in dimethyl sulfoxide at room temperature and the mixture was stirred for two hours, at which time the reaction was essentially complete. After the reaction mixture was allowed to stand overnight at room temperature, the product which had the formula

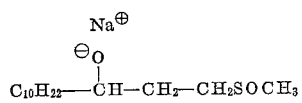

was reacted with methyl iodide (0.1 mole) which was added dropwise to the reaction mixture. The mixture was stirred for two hours at which time the reaction was essentially complete. The mixture was allowed to stand overnight at room temperature and the water was added. The mixture was extracted with methyl acetate, the extracts were dried and the solvent was stripped off. The residue was distilled to obtain a 66% yield of 3-methoxytridecyl methyl sulfoxide (B.P. 175°/0.7 mm.).

The 3-methoxytridecyl methyl sulfoxide is useful as a detergent surfactant.

When in the above example the following groups are substituted for the methyl group and/or the hydrogen atoms in the CH₂ group adjacent to the sulfinyl group and/or one of the hydrogen atoms in the CH₂ group adjacent to the alkoxide group and/or the dodecyl group in the above alkoxide compound so that the total number of carbon atoms in the resulting alkali metal alkoxide compound is less than 32 and so that there are no more than two aromatic groups present in the molecule, substantially the same results are achieved in that the corresponding alkali metal alkoxides react with the alkyl halide compounds to produce the corresponding alkoxy alkyl alkyl sulfoxides: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene; n-decyl; undecyl; n-dodecyl; tridecyl; n-tetradecyl; pentadecyl; n-hexadecyl; n-octadecyl; eicosyl; docosyl; vinyl; propenyl; octenyl; 10-undecenyl; 9-octadecenyl; cyclopentyl; cyclohexyl; cyclohexylmethyl; methylcyclohexyl; 2-cyclohexyldodecyl; 12-cyclohexyldodecyl; 4-dodecylcyclohexyl; propynyl; phenyl; biphenyl; naphthyl; benzyl; 2-phenyl-dodecyl; 1-methyl-2-phenylethyl; 2-indenyl; naphthylmethyl; 3,6,9,12,15-pentathiaheptacosanyl; 3,6,9,12,15-pentaoxaheptacosanyl; 3,6,9-trithiaheptacosanyl; 3,6,9-trioxaheptacosanyl; 2-dodecyloxyethyl; 2-octadecyloxyethyl; 2-methoxyethyl; 2-ethoxyethyl; 2-hexyloxyethyl; 2-octyloxyethyl; 2-dodecylthioethyl; 2-octadecylthioethyl; 2-methylthioethyl; 2-ethylthioethyl; 2-hexylthioethyl; 2-octylthioethyl; 11-methoxyundecyl; 11-methylthioundecyl; 11-ethoxyundecyl; 9- or 10-methoxyoctadecyl; 9- or 10-ethoxyoctadecyl; 9- or 10-methylthiooctadecyl; 2-, 3-, or 4-methoxycyclohexyl; 3- or 4-methylthiocyclohexyl; 3-cyclohexyloxydecyl; 2,5,8,11,14-pentamethyl-3,6,9,12,15-pentaoxaheneicosanyl; 2 - tetrahydrofuranyl; 2-tetrahydrothiophenyl; tetrahydropyranyl; β-(tetrahydropyranyl)-ethyl; β-(2-tetrahydrofuranyl)-ethyl; tetrahydrothiofuranyl; 3,6-dioxaheptyl; 3,6-dithiaheptyl; 3,6,9-triazaheneicosanyl; β-aminoethyl; β-aminopropyl; β-methylaminoethyl; β-methylaminopropyl; β-dimethylaminoethyl; β-dimethylaminopropyl; 5-amino-3-azapentyl; 5-dimethylamino-3-azapentyl; 5 - dimethylamino-3-methazapentyl; 8-amino-3,6-diazaoctyl; 15-amino-3,6,9,12-tetrazapentadecyl; 4,6-dimethoxy-2-sym-triazinyl; 4,6-diamino - 2 - sym-triazinyl; 4-piperidyl; β-(N-piperidyl)-ethyl; β-(N-piperazinyl)-ethyl; β-(N-imidazolyl)-ethyl; β-(N-morpholino)-ethyl; β-(N-oxazolyl)-ethyl; β-(N-pyrrolidyl)-ethyl; 2-thiazolyl; β-(N-anilino)-ethyl; β-N-anilinopropyl; β-N-pyridylethyl; 1-methoxy-2-indanyl; β-N-naphthylaminoethyl; 2-benzoxazolyl; 4,6-dianilino-2-sym-triazinyl; and mixtures thereof.

When in the above example the corresponding potassium and lithium salts of the alkoxide are substituted either wholly or in part for the sodium salts, substantially the same results are achieved in that the reaction with the alkyl halide compound follows essentially the same path.

When in the above examples the following alkyl halides are substituted either wholly or in part for the methyl halide in the above reaction, substantially the same results are obtained in that the alkoxide ion is alkylated with the alkyl group from the following alkyl halide reactants: neopentyl chloride, docosyl bromide, hexadecyl bromide, hexadecyl chloride, 3-(chloromethyl) heptane, amyl chloride, iso-amyl chloride, methyl chloride, dodecyl bromide, ethyl bromide, tetradecyl bromide, alkyl chloride, 1 - bromo - 3,6,9 - trioxaheneicosane, 1-bromo-3,6,9,12-trioxatetracosane, benzyl chloride, 2-phenylethyl bromide, cyclohexylmethyl chloride, 3-pentenyl bromide, 9-octadecenyl bromide, 10-undecenyl bromide, 9- or 10-methoxyoctadecyl bromide, 9- or 10-methylthiooctadecyl bromide, 1-chloro-3,6-dioxaheptane, and mixtures thereof.

When in the above examples the following solvents are substituted either wholly or in part for the dimethyl sulfoxide, substantially equivalent results are obtained in that the same reactions occur: benzene, 1,2-dimethoxy ethane, hexane, petroleum ether, xylenes, diphenyl ether, tetrahydrofuran, butylamine, N,N,-dimethyl formamide, or diethylene glycol dimethyl ether (diglyme), "Stoddard" solvent, toluene, pyridine, diethyl ether, dibutyl ether, anisole, N-methyl butylamine, anhydrous ethylene diamine, morpholine, anhydrous liquid ammonia, and mixtures thereof.

When the 3-methoxytridecyl methyl sulfoxide and the other surface active sulfoxides of the above examples are used with the following detergency builders with a ratio of a builder to a detergent surfactant of about 2½:1 and at a detergent surfactant concentration in water of about 0.02% by weight, excellent detergency effects are obtained.

When in the above examples tripolyphosphates; pyrophosphates; ethylene diaminetetraacetates; N-(2-hydroxyethyl)-ethylenediamine triacetates; nitrilo triacetates; N-(2-hydroxyethyl)-nitrilodiacetates; phytates; ethane-1-hydroxy-1-diphosphonates; methylenediphosphonates; ethylidene diphosphonates; isopropylidene diphosphonates; benzylmethylidene diphosphonates; chloromethylidene diphosphonates; salts of polymers of itaconic acid, aconitic acid, maleic acid, mesaconic acid; fumaric acid, methylene maleic acid and citraconic acid; salts of copolymers of the above acids with themselves; salts of copolymers of the above acids with ethylene; salts of copolymers of the above acids with themselves and ethylene (the foregoing named polymers and copolymers have molecular weights of at least 350 and equivalent weights of from 50 to 80 based on the acid forms); and mixtures thereof in the form of their sodium potassium, triethanolammonium, diethanolammonium and monoethanolammonium salts and mixtures thereof.

What is claimed is:

1. Sulfoxide compounds having the formula

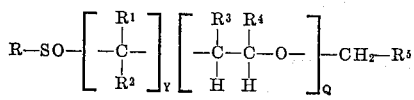

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl, and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moities selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting (A), (B), (C), (D), (E), and (F) can be the entire R group; (b) a moiety selected from the group consisting of (A), (B), (C), (D), (E), (F), and (H) can be attached directly to the sulfinyl group by means of a carbon atom; (c) a moiety selected from the group consisting of (A), (B), (C), (D), (E), and (F) can be attached to a (G) moiety which is attached as hereinafter described; (d) a moiety selected from the group consisting of (A), (D), and (E) can be attached to a moiety selected from the group consisting of (B), (C), and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G), and the sulfinyl group, and the other of which is selected from the group consisting of (B), (C), (F), and (G); and (g) wherein moiety (I) is attached as a substituent to a moiety selected from the group consisting of (A), (B), (C), (D), (E), (F), and (H); said organic group containing from 1 to about 30 carbon atoms, and wherein R is attached to the sulfur atom of the sulfoxide group by a single covalent bond between carbon and sulfur, where $R^1$, $R^2$, $R^3$, $R^4$, and $R^5$ are each selected from the group consisting of hydrogen and organic groups having the same definition as R, and wherein Q is an integer from 1 to about 50 and wherein Y is selected from the group consisting of 0 and 1.

2. The compounds of claim 1 wherein R is a methyl group; $R^1$, $R^2$ and $R^3$ are hydrogen atoms; $R^4$ is a straight chain aliphatic hydrocarbon group containing from about 8 to about 20 carbon atoms; and $R^5$ is a hydrocarbon group containing from 1 to about 3 carbon atoms.

3. The compounds of claim 1 wherein R is a methyl group; $R^1$, $R^2$, and $R^3$ are hydrogen atoms; $R^4$ is a straight chain aliphatic hydrocarbon group containing from about 8 to about 20 carbon atoms; and $R^5$ is a hydrogen atom.

4. Sulfoxide compounds having the formula

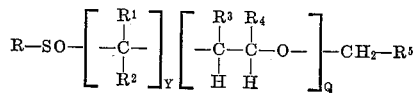

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, napthyl, and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of sym-triazinyl, piperidinyl, imidazolyl, morpholino, pyrrolidyl, furyl, tetrahydrofuranyl, tetrahydropyranyl, oxazolyl, thiazolyl, tetrahydrothiophenyl, tetrahydrothiofuranyl, and benzoxazolyl moieties; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following:

(a) a moiety selected from the group consisting of (A), (B), (C), (D), (E), and (F) can be the entire R group; (b) a moiety selected from the group consisting of (A), (B), (C), (D), (E), (F), and (H) can be attached directly to the sulfinyl group by means of a carbon atom; (c) a moiety selected from the group consisting of (A), (B), (C), (D), (E), and (F) can be attached to a (G) moiety which is attached as hereinafter described; (d) a moiety selected from the group consisting of (A), (D), and (E) can be attached to a moiety selected from the group consisting of (B), (C), and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G), and the sulfinyl group, and the other of which is selected from the group consisting of (B), (C), (F), and (G); and (g) wherein moiety (I) is attached as a substituent to a moiety selected from the group consisting of (A), (B), (C), (D), (E), (F), and (H); said organic groups containing from 1 to about 30 carbon atoms, and wherein R is attached to the sulfur atom of the sulfoxide group by a single covalent bond between carbon and sulfur, and wherein $R^1$, $R^2$, $R^3$, $R^4$, and $R^5$ are each selected from the group consisting of hydrogen and organic groups having the same definition as R, and wherein Q is an integer from 1 to about 50 and wherein Y is selected from the group consisting of 0 and 1.

5. The compounds of claim 4 wherein R is a methyl group; $R^1$, $R^2$, and $R^3$ are hydrogen atoms; $R^4$ is a straight chain aliphatic hydrocarbon group containing from about 8 to about 20 carbon atoms; and $R^5$ is a hydrocarbon group containing from 1 to about 3 carbon atoms.

6. The compounds of claim 4 wherein R is a methyl group; $R^1$, $R^2$, and $R^3$ are hydrogen atoms; $R^4$ is a straight chain aliphatic hydrocarbon group containing from about 8 to about 20 carbon atoms; and $R^5$ is a hydrogen atom.

7. Sulfoxide compounds having the formula

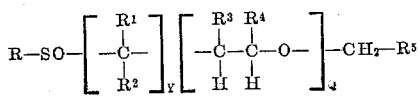

wherein R is an organic group containing moieties selected from the group consisting of methyl;
ethyl;
n-propyl;
isopropyl;
n-butyl;
isobutyl;
n-pentyl;
isopentyl;
n-hexyl;
n-heptyl;
n-octyl;
isooctyl;
2-ethylhexyl;
diisobutyl;
n-nonyl;
tripropylene;
n-decyl;
undecyl;
n-dodecyl;
tridecyl;
n-tetradecyl;
pentadecyl;
n-hexadecyl;
n-octadecyl;
eicosyl;
docosyl;
vinyl;
propenyl;
octenyl;
10-undecenyl;
9-octadecenyl;
cyclopentyl;
cyclohexyl;
cyclohexylmethyl;
methylcyclohexyl;
2-cyclohexyldodecyl;
12-cyclohexyldodecyl;
4-dodecylcyclohexyl;
propynyl;
phenyl;
biphenyl;
naphthyl;
benzyl;
2-phenyldodecyl;
1-methyl-2-phenylethyl;
2-indenyl;
naphthylmethyl;
3,6,9,12,15-pentathiaheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-ocylthioethyl;
11-methoxyundecyl;
11-methylthioundecyl;
11-ethoxyundecyl;
9-methoxyoctadecyl;
10-methoxyoctadecyl;
9-ethoxyoctadecyl;
10-ethoxyoctadecyl;
9-methylthiooctadecyl;
10-methylthiooctadecyl;
2-methoxycyclohexyl;
3-methoxycyclohexyl;
4-methoxycyclohexyl;
2-methylthiocyclohexyl;
4-methylthiocyclohexyl;
3-cyclohexyloxydecyl;
2,5,8,11,14-pentamethyl-3,6,9,12,15-pentaoxaheneicosanyl;
2-tetrahydrofuranyl;
tetrahydropyranyl;
β-(tetrahydropyranyl)-ethyl;
β-(2-tetrahydrofuranyl)-ethyl;
tetrahydrothiofuranyl;
3,6-dioxaheptyl;
3,6-dithiaheptyl;
3,6,9-triazaheneicosanyl;
β-aminoethyl;
β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl;
2-thiazolyl;
β-(N-anilino)-ethyl;
β-N-anilino-propyl;
β-N-pyridylethyl;
1-methoxy-2-indanyl;
β-N-naphthylaminoethyl;
2-benzoxazolyl;
4,6-dianilino-2-sym-triazinyl;

and mixtures thereof, and wherein $R^1$, $R^2$, $R^3$, $R^4$, and $R^5$ are each selected from the group consisting of hydrogen and organic groups having the same definition as R, and where Q is an integer from 1 to about 50 and wherein Y is selected from the group consisting of 0 and 1.

References Cited by the Examiner

UNITED STATES PATENTS

| 2,787,595 | 4/1957 | Webb | 252—138 |
| 2,846,401 | 8/1958 | McCarthy et al | 252—138 |
| 3,124,618 | 3/1964 | Berry | 260—607 |
| 3,146,271 | 8/1964 | Louthan | 260—607 |

OTHER REFERENCES

Wagner and Zook, "Synthetic Organic Chemistry," Chapman and Hall, p. 226 (1953).

CHARLES B. PARKER, *Primary Examiner.*

ALBERT T. MEYERS, JOSEPH P. BRUST,
*Examiners.*

DELBERT R. PHILLIPS, *Assistant Examiner.*

Notice of Adverse Decisions in Interferences

In Interference No. 97,934 involving Patent No. 3,288,858, W. I. Lyness and D. E. O'Connor, SULFOXIDES AND SYNTHESES THEREOF, final judgment adverse to the patentees was rendered May 4, 1973, as to claim 7.

[*Official Gazette September 4, 1973.*]